(12) United States Patent
Allen (10) Patent No.: US 11,075,390 B2
(45) Date of Patent: Jul. 27, 2021

(54) APPARATUS AND ASSOCIATED METHODS FOR ELECTRICAL STORAGE

(71) Applicant: Nokia Technologies Oy, Espoo (FI)

(72) Inventor: Mark Allen, Great Cambourne (GB)

(73) Assignee: Nokia Technologies Oy, Espoo (FI)

( * ) Notice: Subject to any disclaimer, the term of this patent is extended or adjusted under 35 U.S.C. 154(b) by 301 days.

(21) Appl. No.: 16/329,365

(22) PCT Filed: Sep. 11, 2017

(86) PCT No.: PCT/FI2017/050641
§ 371 (c)(1),
(2) Date: Feb. 28, 2019

(87) PCT Pub. No.: WO2018/055233
PCT Pub. Date: Mar. 29, 2018

(65) Prior Publication Data
US 2019/0198888 A1    Jun. 27, 2019

(30) Foreign Application Priority Data
Sep. 20, 2016    (EP) .................................. 16189793

(51) Int. Cl.
*H01M 6/40*    (2006.01)
*H01M 6/32*    (2006.01)
(52) U.S. Cl.
CPC ............... *H01M 6/40* (2013.01); *H01M 6/32* (2013.01)

(58) Field of Classification Search
CPC ....... H01M 6/32; H01M 6/40; H01M 10/0409
See application file for complete search history.

(56) References Cited

U.S. PATENT DOCUMENTS

| 9,590,283 | B2 | 3/2017 | Ootani et al. ....... H01M 12/065 |
| 2003/0186117 | A1 | 10/2003 | Shokoohi et al. ............ 429/162 |
| 2005/0100781 | A1 | 5/2005 | Jang et al. ...................... 429/61 |
| 2009/0239133 | A1 | 9/2009 | Kosugi ........................... 429/94 |

FOREIGN PATENT DOCUMENTS

| CN | 101916879 A | 12/2010 |
| EP | 3 007 266 A1 | 4/2016 |
| EP | 3 016 179 A1 | 5/2016 |
| JP | 2012022899 A | 2/2012 |
| JP | 2014013696 A | 1/2014 |
| WO | WO-2016/066889 A1 | 5/2016 |

*Primary Examiner* — Adam A Arciero
(74) *Attorney, Agent, or Firm* — Harrington & Smith

(57) ABSTRACT

An apparatus including a proton battery and a casing for the proton battery, the proton battery including first and second electrodes configured to form an electrode junction configured to generate protons in the presence of water to produce a potential difference, the proton battery further including respective charge collectors in contact with the first and second electrodes; the casing configured to inhibit exposure of the electrode junction to water from the surrounding environment when the proton battery is contained within the casing, the casing including a pair of electrical terminals electrically connected to the respective charge collectors of the proton battery, wherein the proton battery is formed as a continuous strip of material, and wherein the casing includes an opening configured to enable a length of the continuous strip to be extracted from the casing.

15 Claims, 6 Drawing Sheets

"Empty battery" can be cut away

Figure 3

310 Humidity exposed part of battery

Dry-air package 308

APPARATUS AND ASSOCIATED METHODS FOR ELECTRICAL STORAGE

CROSS REFERENCE TO RELATED APPLICATION

This patent application is a U.S. National Stage application of International Patent Application Number PCT/FI2017/050641 filed Sep. 11, 2017, which is hereby incorporated by reference in its entirety, and claims priority to EP 16189793.9 filed Sep. 20, 2016.

TECHNICAL FIELD

The present disclosure relates to the field of electrical storage, associated methods and apparatus. Certain embodiments specifically concern an apparatus comprising a proton battery and a casing for the proton battery. In these embodiments, the proton battery is formed as a continuous strip of material, and the casing comprises an opening configured to enable a length of the continuous strip to be extracted from the casing and exposed to water from the surrounding environment to produce a potential difference.

Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches and tablet PCs. The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop smaller electrical storage cells having a greater storage capacity than existing storage cells for use in modern electronic devices.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a proton battery and a casing for the proton battery, the proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes;

the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit, wherein the proton battery is formed as a continuous strip of material, and wherein the casing comprises an opening configured to enable a length of the continuous strip to be extracted from the casing and exposed to water from the surrounding environment to produce the potential difference.

The continuous strip of material may be rolled up inside the casing and configured to rotate about a central axis as a length of the continuous strip is extracted from the casing.

The proton battery may comprise a central post around which the continuous strip of material is wound. The central post may have electrically conductive end portions separated by an electrically insulating central portion. The electrically conductive end portions may be electrically connected to respective charge collectors at one end of the continuous strip and configured to contact corresponding electrical terminals at opposite ends of the casing during rotation of the proton battery.

The continuous strip of material may be folded up into a concertina structure inside the casing and configured to unfold as a length of the continuous strip is extracted from the casing.

One end of the continuous strip may be fixed to a wall of the casing, and the charge collectors at that end may be electrically connected to respective electrical terminals located on said wall of the casing.

The casing may be configured to form one or more of an airtight and watertight seal around the proton battery, and the opening may be configured to maintain the seal during and/or after extraction of a length of the continuous strip from the casing.

The opening may comprise a resilient material configured to undergo deformation during extraction of a length of the continuous strip from the casing, and clamp the continuous strip automatically once the length has been extracted.

The first and second electrodes and their respective charge collectors may be formed on the surface of a flexible substrate to produce a substantially two-dimensional proton battery. The flexible substrate may comprise one or more of polyimide, polyether ether ketone, polyester, polyethylene naphthalate and polyetherimide.

The proton battery may comprise an adhesive at the edges of the continuous strip configured to sealingly attach the continuous strip of material to itself whilst it is inside the casing to further inhibit exposure of the electrode junction to water from the surrounding environment.

The continuous strip of material may be divided into a plurality of discrete lengths by adjoining sections in which the first and second electrodes are absent.

The adjoining sections may comprise an adhesive configured to sealingly attach the continuous strip of material to itself whilst it is inside the casing to further inhibit exposure of the electrode junctions of the respective discrete lengths to water from the surrounding environment.

The adhesive may be impermeable to water from the surrounding environment.

The continuous strip of material may comprise demarcations configured to indicate one or more of the start and end of each discrete length to guide extraction of a length of the continuous strip of material from the casing.

The first and second electrodes may be configured to form an electrode junction which extends along the length of the continuous strip in one or more of a linear, sinusoidal, square wave or zig-zag pattern.

The first electrode may comprise graphene oxide, and the second electrode may comprise one or more of reduced graphene oxide, potassium hydroxide and poly(3,4-ethylenedioxythiophene) polystyrene sulfonate.

The apparatus may comprise an electrolyte configured to facilitate the flow of generated protons between the first and second electrodes.

The electrolyte may be configured to absorb water from the surrounding environment and deliver it to the electrode junction to facilitate the generation of protons.

The electrolyte may comprise one or more of a room-temperature ionic liquid and an ion gel. The room-temperature ionic fluid may be a liquid or gel at least within one or more of the following temperature ranges: $-100°$ C. to $+100°$ C.; $-50°$ C. to $+50°$ C.; $+15°$ C. to $+35°$ C.; and $+20°$ C. to $+27°$ C.

The room-temperature ionic liquid may comprise one or more of triethylsulfonium bis(trifluoromethylsulfonyl)imide ([SET3][TFSI]), 1-buthyl-3-methyl-imidazolium ([BMIM][CI]), and trioctylmethylammonium bis(trifluoromethylsulfonyl)imide ([OMA][TFSI]).

The room-temperature ionic fluid may be hydrophilic and ionically conductive.

The electrolyte may further comprise one or more salts configured to aid the flow of protons between the first and second electrodes and/or enhance the adsorption of water by the room-temperature ionic fluid from the surrounding environment. The one or more salts may comprise at least one of lithium bis(trifluoromethylsulfonyl)imide, lithium chloride and sodium chloride.

One or more of the charge collectors of the proton battery, the electrically conductive end portions of the central post of the proton battery and the electrical terminals of the casing may comprise at least one of a metal, an alloy, gold, silver and copper.

The first electrode may be a cathode of the proton battery and the second electrode may be an anode of the proton battery.

The apparatus may be one or more of an electronic device, a portable electronic device, a portable telecommunications device, a mobile phone, a tablet, a phablet, a personal digital assistant, a laptop computer, a desktop computer, a smartphone, a smartwatch, smart eyewear, a proton battery, and a module for one or more of the same.

According to a further aspect, there is provided a method of making an apparatus, the method comprising:
  forming a proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes; and
  forming a casing for the proton battery, the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit,
  wherein the proton battery is formed as a continuous strip of material, and wherein the casing comprises an opening configured to enable a length of the continuous strip to be extracted from the casing and exposed to water from the surrounding environment to produce the potential difference.

Forming the proton battery may comprise:
depositing a layer of graphene oxide as the first electrode; and
selectively exposing a region of the deposited graphene oxide layer to electromagnetic radiation to create a region of reduced graphene oxide as the second electrode adjacent to a neighbouring region of unexposed graphene oxide, the graphene oxide and adjacent reduced graphene oxide regions forming an electrode junction therebetween.

Depositing the layer of graphene oxide may comprise printing a graphene oxide ink onto a flexible substrate.

According to a further aspect, there is provided a method of using an apparatus,
  the apparatus comprising a proton battery and a casing for the proton battery,
    the proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes;
    the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit,
    wherein the proton battery is formed as a continuous strip of material, and wherein the casing comprises an opening configured to enable a length of the continuous strip to be extracted from the casing and exposed to water from the surrounding environment to produce the potential difference,
  the method comprising extracting a length of the continuous strip from the casing via the opening to expose the electrode junction to water from the surrounding environment and produce a potential difference between the first and second electrodes. The first and second electrodes may be configured to form a junction with one another at an interface therebetween. The electrolyte may be in contact with the junction of the first and second electrodes.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Figure 1A:
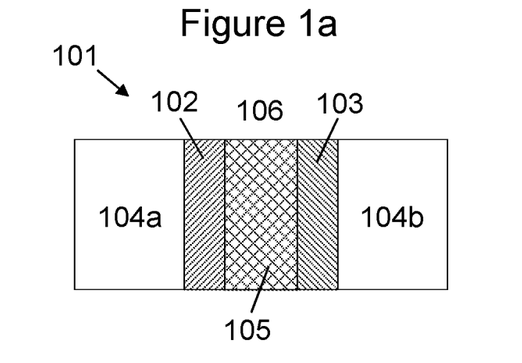
FIG. 1a shows a proton battery in plan view.
Figure 1B:
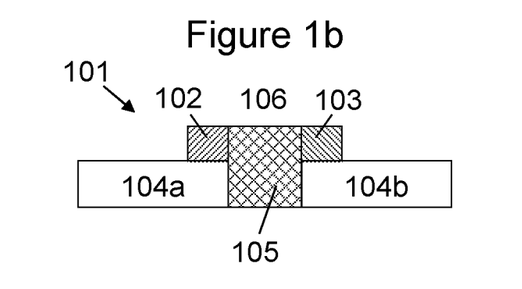
FIG. 1b shows the proton battery of FIG. 1a in cross-section.

FIGS. 1a and 1b show the general structure of a proton battery 101 in plan view and cross-section, respectively. The proton battery 101 comprises first 102 and second 103 electrodes deposited such that they at least partly overlie respective charge collectors 104a,b and form an electrode junction 105 with one another at an interface therebetween (e.g. where the electrode materials intermix and/or overlie one another). The energy generation mechanism involves degradation of the electrode junction 105 when in contact with water to produce a potential difference between the first 102 and second 103 electrodes. The water may be contained within the proton battery 101 or it may come from the surrounding environment 106 (e.g. in the form of air humidity).

Various materials may be used to form the first 102 and second 103 electrodes (and therefore the electrode junction 105). One particular example involves a first electrode 102 (cathode) comprising graphene oxide (GO) and a second electrode 103 (anode) comprising reduced graphene oxide (rGO). Other suitable anode materials include potassium hydroxide and poly(3,4-ethylenedioxythiophene) polystyrene sulfonate. In addition, the charge collectors 104a,b may be formed from any electrically conductive material, such as a metal or conductive alloy comprising gold, silver or copper.

One disadvantage with proton batteries 101 is the unintentional reaction of the electrode junction 105 with the ambient humidity when electrical power is not required, which has been found to reduce their shelf-life. The apparatus and methods described herein may address this issue.

Figure 2A:
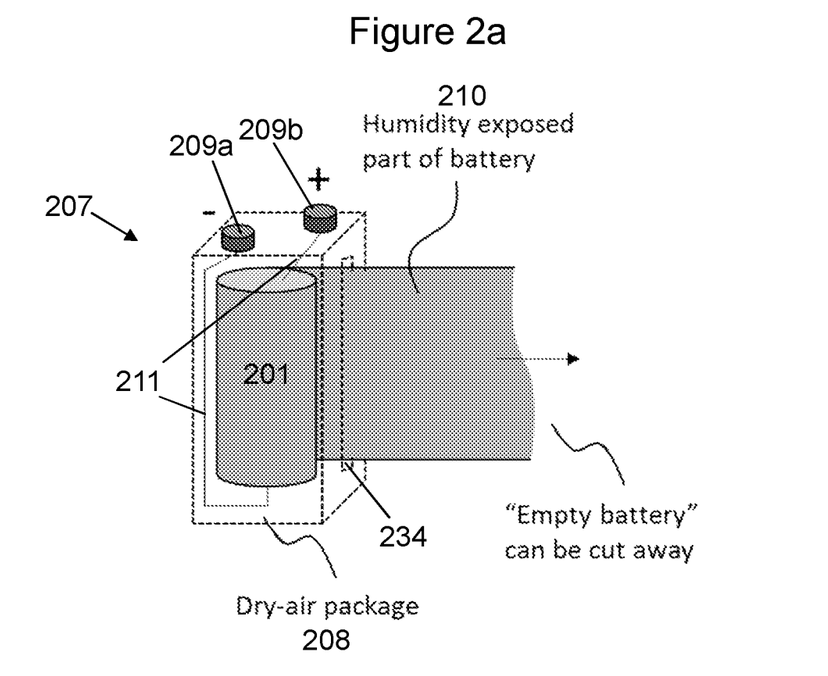
FIG. 2a shows one example of the present apparatus in which the proton battery is rolled up inside the casing.

FIG. 2a shows one example of the present apparatus 207. The apparatus 207 comprises a proton battery 101, 201 as described with reference to FIGS. 1a and 1b, and a casing 208 configured to inhibit exposure of the electrode junction 105 to water from the surrounding environment 106 when the proton battery 101, 201 is contained within the casing 207. The casing 207 comprises a pair of electrical terminals 209a,b electrically connected to the respective charge collectors 104a,b of the proton battery 101, 201 such that the potential difference between the first 102 and second 103 electrodes can be used to power an external circuit. The electrical terminals 208a,b extend through the wall of the casing 207 to the external surface for connection to corresponding electrical terminals of a device to be electrically powered by the apparatus 207 (similar to the electrical terminals of a conventional cylindrical or rectangular battery). Furthermore, the proton battery 101, 201 is formed as a continuous strip of material, and the casing 208 comprises an opening 234 (in this example, a slot) configured to enable a length 210 of the continuous strip to be extracted from the casing 208 and exposed to water from the surrounding environment 106 to produce the potential difference. Extraction of the length 210 of the continuous strip may be performed manually by a user of the apparatus 207, or by an electronic control mechanism (e.g. triggered when the user presses a button on the apparatus 207).

The present apparatus 207 provides an innovative packaging solution which allows the proton battery 101, 201 to remain sealed from the ambient humidity until required. Since the proton battery 101, 201 is only activated when exposed to the surrounding environment 106 (i.e. no voltage is generated unless exposed), it can be continuously connected to an external circuit without discharging. In addition, when electrical power is required, a desired length 210 of the continuous strip can be extracted from the casing 208 on demand without unwanted exposure of the remaining length to the ambient humidity. The energy capacity (and therefore discharge time) of the proton battery 101, 201 depends on the extracted length 210 of the continuous strip: the longer the length 210 extracted, the longer the proton battery 101, 201 can provide electrical power for before becoming discharged (at which point the electrode junction of the extracted length 210 has been fully degraded). Once the extracted length 210 has been used up, it can then be removed to leave the remaining length for future use.

In the example shown in FIG. 2a, the continuous strip of material is rolled up inside the casing 208 and is configured to rotate about a central axis as a length 210 of the continuous strip is extracted from the casing 208. It is important, however, that the electrical connections 211 between the electrical terminals 209a,b of the casing 208 and the charge collectors 104a,b of the proton battery 101, 201 remain intact during rotation of the proton battery 101, 201, otherwise the electrical path between the proton battery 101, 201 and external circuit will be broken.

Figure 2B:
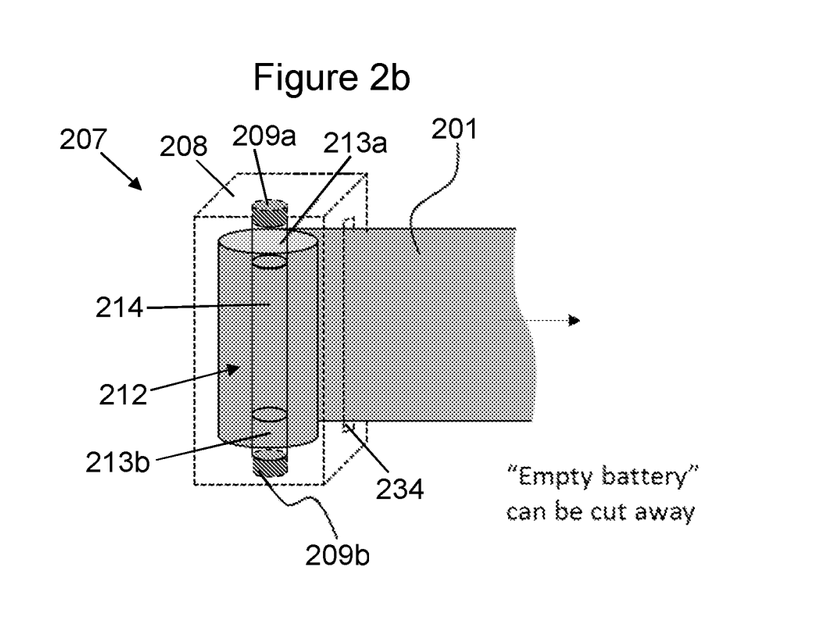
FIG. 2b shows another example of the present apparatus in which the proton battery is wound around a central post.

FIG. 2b shows one configuration which allows the electrical path between the proton battery 101, 201 and the external circuit to be maintained whilst a length of the continuous strip is being extracted from the casing 208. In this example, the proton battery 101, 201 comprises a central post 212 around which the continuous strip of material is wound, and the casing 208 comprises an electrical terminal 209a,b at each end. The central post 212 has electrically conductive end portions 213a,b separated by an electrically insulating central portion 214. The electrically conductive end portions 213a,b are electrically connected to respective charge collectors 104a,b at one end of the continuous strip and configured to contact the corresponding electrical terminals 209a,b at opposite ends of the casing 208 during rotation of the proton battery 101, 201.

One or more of the positioning and shape of the electrical terminals 209a,b may be configured to ensure sufficient contact with the electrically conductive end portions 213a,b (similar to the electrical terminals of a battery compartment or charger). For example, the electrical terminals 209a,b may be positioned or mechanically biased to provide a friction fit with the electrically conductive end portions 213a,b. Additionally or alternatively, the shape of the electrical terminals 209a,b may be configured to complement the shape of the electrically conductive end portions 213a,b (e.g. the electrical terminals 209a,b may comprise a receiving portion configured for insertion of the electrically conductive end portions 213a,b). The electrically conductive end portions 213a,b of the central post 212 and/or the electrical terminals 209a,b of the casing 208 may comprise one or more of a metal, an alloy, gold, silver and copper.

Figure 3:
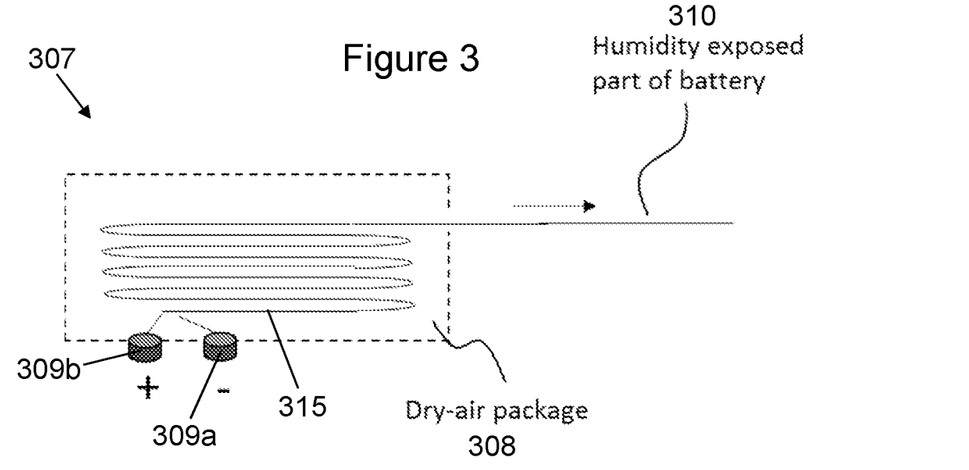
FIG. 3 shows another example of the present apparatus in which the proton battery is folder up into a concertina structure inside the casing.

FIG. 3 shows another example of the present apparatus 307. In this example, the continuous strip is folded up into a concertina structure inside the casing 308 and is configured to unfold as a length 310 of the continuous strip is extracted from the casing 308. Furthermore, one end 315 of the continuous strip is fixed to a wall of the casing 308, and the charge collectors 104a,b at that end are electrically connected to respective electrical terminals 309a,b located on said wall of the casing 308.

In some examples described herein, the casing 208, 308 may be configured to form one or more of an airtight and watertight seal around the proton battery 101, 201, and the opening 234 may be configured to maintain the seal during and/or after extraction of a length 210, 310 of the continuous strip from the casing 208, 308. One way of maintaining the seal is to form the opening 234 from a resilient material which is configured to undergo deformation during extraction of a length 210, 310 of the continuous strip from the casing 208, 308, and clamp the continuous strip automatically once the length 210, 310 has been extracted. This type of opening 234 may be capable of maintaining the seal during and after extraction. Another option is to form a re-sealable opening 234 which can be used to temporarily break the seal to enable extraction of a length 210, 310 of the continuous strip and then reseal the casing 208, 308 thereafter (similar to food packaging).

Figure 4:
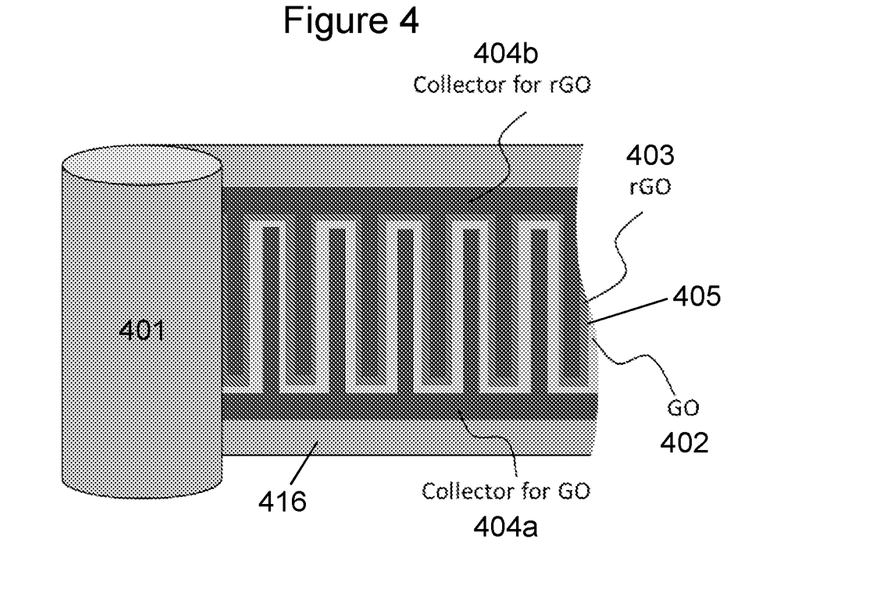
FIG. 4 shows another example of the present apparatus in which the electrode junction extends along the length of the continuous strip in a square wave pattern.

FIG. 4 shows greater detail of the proton battery itself 401. Although the proton battery 401 in this figure has the rolled-up structure, the electrode configuration described below is also applicable to proton batteries having the folded-up concertina structure. In this example, the first 402 and second 403 electrodes and their respective charge collectors 404a,b are formed on the surface of a flexible substrate 416 to produce a substantially two-dimensional proton battery 401. The flexible substrate 416 may comprise one or more of polyimide, polyether ether ketone, polyester, polyethylene naphthalate and polyetherimide. Furthermore, the first 402 and second 403 electrodes are configured to form an electrode junction 405 which extends along the length of the flexible substrate 416 in a square wave pattern, and the charge collectors 404a,b take the form of interdigitated electrical contacts. Other configurations are also possible, however. For example, the first 402 and second 403 electrodes may be configured to form an electrode junction 405 which extends along the length of the flexible substrate 416 in a linear, sinusoidal or zig-zag pattern.

Figure 5:
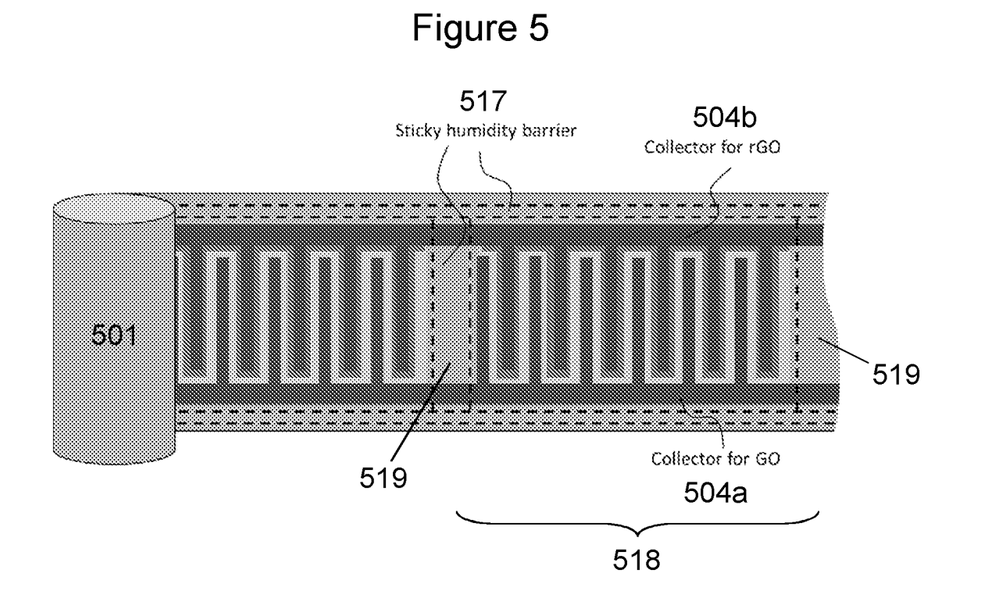
FIG. 5 shows another example of the present apparatus in which the proton battery comprises adhesive regions to further inhibit exposure of the electrode junction to water from the surrounding environment whilst the proton battery is inside the casing.

FIG. 5 shows another example of a proton battery 501 suitable for use in both the rolled and folded configurations (although only the rolled configuration is shown). In this example, the proton battery 501 comprises an adhesive 517 at the edges of the continuous strip configured to sealingly attach the continuous strip of material to itself whilst it is rolled/folded up inside the casing to further inhibit exposure of the electrode junction to water from the surrounding environment. The adhesive 517 itself may or may not be impermeable to water from the surrounding environment, but the use of a water-impermeable adhesive 517 may help to prevent inadvertent exposure to any ambient humidity inside the casing and therefore increase the shelf-life of the proton battery 501.

As also shown in FIG. 5, the continuous strip of material may be divided into a plurality of discrete lengths 518 by adjoining sections 519 in which the first and second electrodes are absent. The discrete lengths 518 may be predetermined to provide a particular amount of electrical energy for a particular length of time so that a user knows what length to extract from the casing for a given purpose. In addition, the adjoining sections 519 may serve as demarcations configured to indicate one or more of the start and end of each discrete length 518 to guide extraction of a length of the continuous strip of material from the casing (although other demarcations could be used instead).

In this example, the adjoining sections 519 comprise an adhesive 517 (as described above) configured to sealingly attach the continuous strip of material to itself whilst it is rolled/folded up inside the casing to further inhibit exposure of the electrode junctions of the respective discrete lengths 518 to water from the surrounding environment. The adjoining sections 519 may also comprise perforations (not shown) to facilitate the removal of discrete lengths 518 in which the electrode junction has already been fully degraded.

Figure 6:
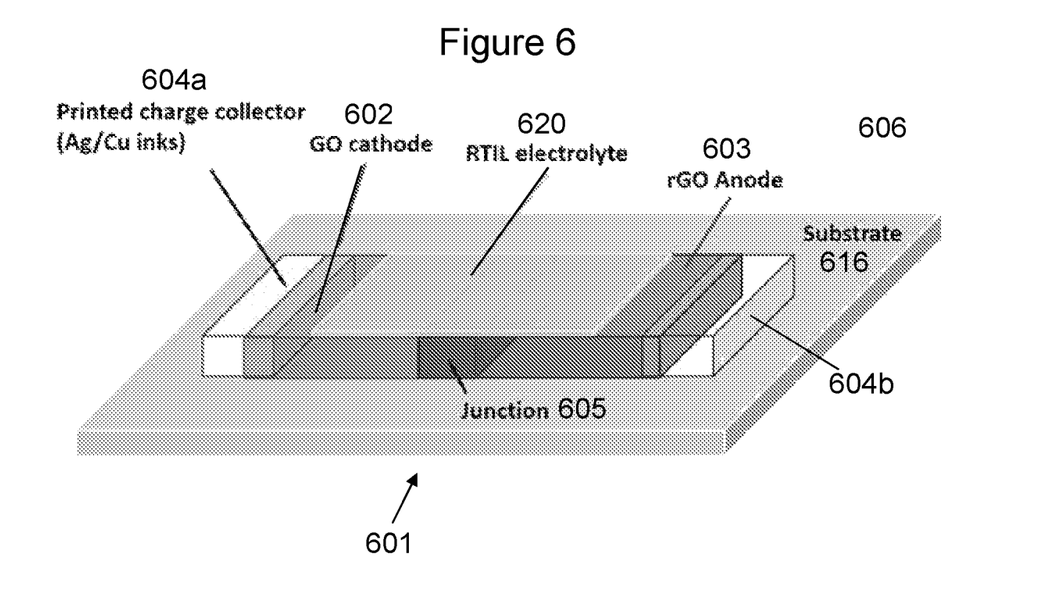
FIG. 6 shows another example of the present apparatus in which the proton battery further comprises an electrolyte.

FIG. 6 shows another example of the proton battery 601. In this example, the proton battery 601 further comprises an electrolyte 620 configured to facilitate the flow of generated protons between the first 602 and second 603 electrodes (although this is not essential in proton batteries due to the presence of the electrode junction 605). In some cases, the electrolyte 620 may be configured to absorb water from the surrounding environment 606 and deliver it to the electrode junction 605 to facilitate the generation of protons. In order to achieve this, the electrolyte 620 should be hydrophilic and ionically conductive. Suitable electrolytes include room-temperature ionic liquids (RTIL) and ion gels (such as triethylsulfonium bis(trifluoromethylsulfonyl)imide ([SET3][TFSI]), 1-buthyl-3-methyl-imidazolium ([BMIM][CI]), or trioctylmethylammonium bis(trifluoromethylsulfonyl)imide ([OMA][TFSI]). The electrolyte 620 should preferably be in a liquid or gel state at least within one or more of the following temperature ranges: $-100°$ C. to $+100°$ C.; $-50°$ C. to $+50°$ C.; $+15°$ C. to $+35°$ C.; and $+20°$ C. to $+27°$ C. The electrolyte 620 may also comprise one or more salts configured to aid the flow of protons between the first 602 and second 603 electrodes and/or enhance the adsorption of water from the surrounding environment 606. The one or more salts may comprise at least one of lithium bis(trifluoromethylsulfonyl)imide, lithium chloride and sodium chloride.

Figure 7:
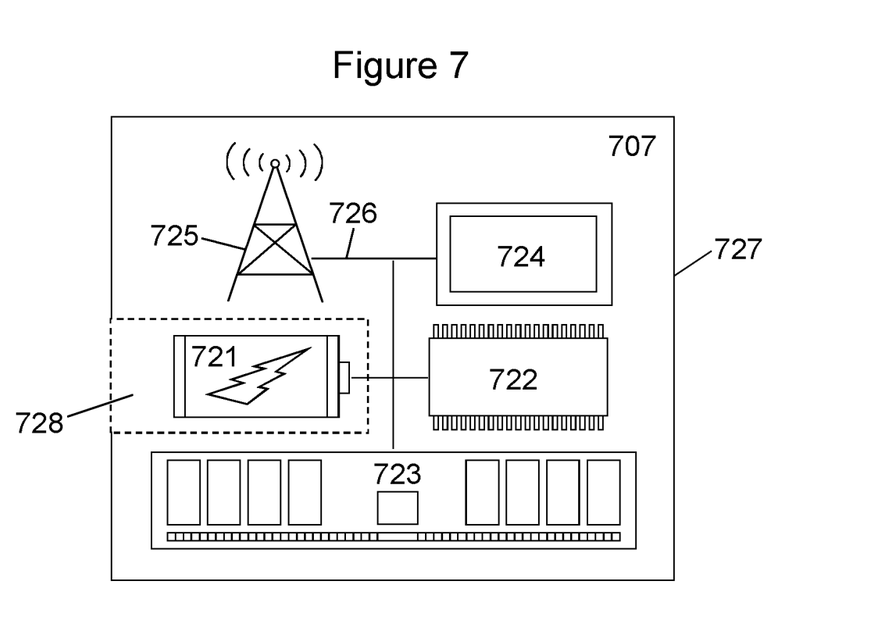
FIG. 7 shows another example of the present apparatus.

FIG. 7 shows another example of the present apparatus 707. In this example, the apparatus 707 comprises some or all of the components described herein (shown in FIG. 7 as an electrical storage device 721), a processor 722, a storage medium 723, an electronic display 724 and a transceiver 725, which are electrically connected to one another by a data bus 726 and contained within a housing 727. The apparatus 707 may be one or more of an electronic device, a portable electronic device, a portable telecommunications device, a mobile phone, a tablet, a phablet, a personal digital assistant, a laptop computer, a desktop computer, a smartphone, a smartwatch, smart eyewear, and a module for one or more of the same.

The electrical storage device 721 is configured to provide electrical power to the other components to enable their functionality. In this respect, the other components may be considered to be the external circuit referred to previously.

The housing 727 may comprise an opening 728 configured to provide access to the electrical storage device 721 to enable extraction of a length of the continuous strip. The housing 727 may also allow humid air from the environment surrounding the apparatus 707 to enter the housing and react with an extracted length of the continuous strip of the electrical storage device 721. In other examples, however, the opening 728 of the housing 727 may be configured such that the extracted length of the continuous strip can be passed through the opening 728 for exposure to the surrounding environment.

The electronic display 724 is configured to display content stored on the apparatus 707 (e.g. stored on the storage medium 723), and the transceiver 725 is configured to transmit and/or receive data to/from one or more other devices via a wired or wireless connection.

The processor 722 is configured for general operation of the apparatus 707 by providing signalling to, and receiving signalling from, the other components to manage their operation. The storage medium 723 is configured to store computer code configured to perform, control or enable operation of the apparatus 707. The storage medium 723 may also be configured to store settings for the other components. The processor 722 may access the storage medium 723 to retrieve the component settings in order to manage the operation of the other components.

The processor 722 may be a microprocessor, including an Application Specific Integrated Circuit (ASIC). The storage medium 723 may be a temporary storage medium such as a volatile random access memory. On the other hand, the storage medium 723 may be a permanent storage medium such as a hard disk drive, a flash memory, or a non-volatile random access memory.

Figure 8:
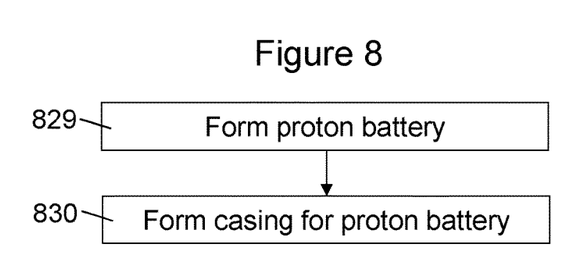
FIG. 8 shows a method of making the present apparatus.

FIG. 8 shows the main steps 829-830 of a method of making the apparatus described herein. The method generally comprises: forming the proton battery 829; and forming the casing for the proton battery 830. These steps 829, 830 may be performed using a variety of different fabrication processes. Advantageously, the electrodes (with or without charge collectors) may be printed, e.g. using inkjet printing.

Figure 9:
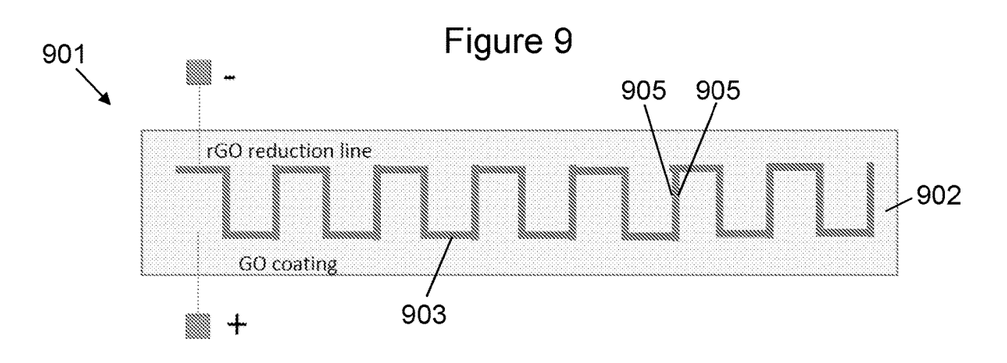
FIG. 9 shows a method of forming an electrode junction.

FIG. 9 shows one method of forming the proton battery 901. First, a layer of graphene oxide 902 is deposited as the first electrode. A region of the deposited graphene oxide layer 902 is then selectively exposed to electromagnetic radiation to create a region of reduced graphene oxide 903 as the second electrode adjacent to a neighbouring region of unexposed graphene oxide 902. In this scenario, the graphene oxide 902 and adjacent reduced graphene oxide 903 regions form an electrode junction 905 therebetween.

Figure 10:
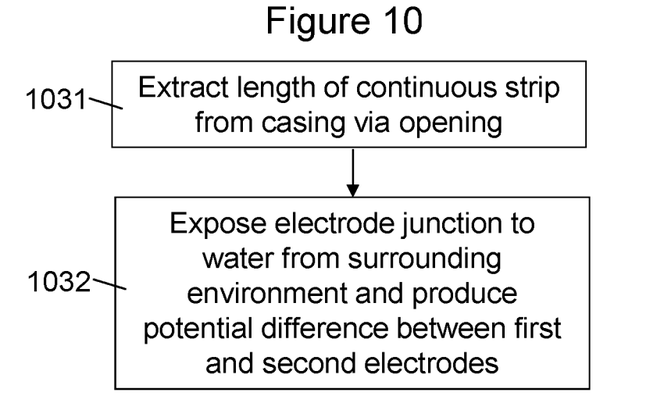
FIG. 10 shows a method of using the present apparatus.

FIG. 10 shows the main steps 1031-1032 of a method of using the apparatus described herein. The method generally comprises: extracting a length of the continuous strip from the casing via the opening 1031; and exposing the electrode junction to water from the surrounding environment to produce a potential difference between the first and second electrodes 1032.

Figure 11:
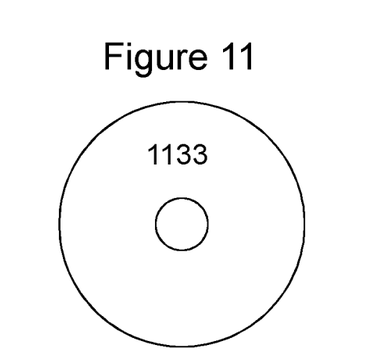
FIG. 11 shows a computer-readable medium comprising a computer program configured to perform, control or enable one or more of the method steps of FIG. 8 or 10.

FIG. 11 illustrates schematically a computer/processor readable medium 1133 providing a computer program according to one embodiment. The computer program may comprise computer code configured to perform, control or enable one or more of the method steps 829-830 of FIG. 8 and/or one or more of the method steps 1031-1032 of FIG. 10. In this example, the computer/processor readable medium 1133 is a disc such as a digital versatile disc (DVD) or a compact disc (CD). In other embodiments, the computer/processor readable medium 1133 may be any medium that has been programmed in such a way as to carry out an inventive function. The computer/processor readable medium 1133 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state).

The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/ position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a proton battery and a casing for the proton battery, the proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes; the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit, wherein the proton battery is formed as a continuous strip of material, and wherein the casing comprises an opening configured to enable a length of the continuous strip to be extracted from the casing and exposed to water from the surrounding environment to produce the potential difference.

2. The apparatus of claim 1, wherein the continuous strip of material is rolled up inside the casing and is configured to rotate about a central axis as a length of the continuous strip is extracted from the casing.

3. The apparatus of claim 2, wherein the proton battery comprises a central post around which the continuous strip of material is wound, the central post having electrically conductive end portions separated by an electrically insulating central portion, the electrically conductive end portions electrically connected to respective charge collectors at one end of the continuous strip and configured to contact corresponding electrical terminals at opposite ends of the casing during rotation of the proton battery.

4. The apparatus of claim 1, wherein the continuous strip of material is folded up into a concertina structure inside the casing and is configured to unfold as a length of the continuous strip is extracted from the casing.

5. The apparatus of claim 4, wherein one end of the continuous strip is fixed to a wall of the casing, and the charge collectors at that end are electrically connected to respective electrical terminals located on said wall of the casing.

6. The apparatus of claim 1, wherein the casing is configured to form one or more of an airtight and watertight seal around the proton battery, and wherein the opening is configured to maintain the seal during and/or after extraction of a length of the continuous strip from the casing.

7. The apparatus of claim 6, wherein the opening comprises a resilient material configured to undergo deformation during extraction of a length of the continuous strip from the casing, and clamp the continuous strip automatically once the length has been extracted.

8. The apparatus of claim 1, wherein the first and second electrodes and their respective charge collectors are disposed on a surface of a flexible substrate.

9. The apparatus of claim 1, wherein the proton battery comprises an adhesive at the edges of the continuous strip configured to sealingly attach the continuous strip of material to itself whilst it is inside the casing to further inhibit exposure of the electrode junction to water from the surrounding environment.

10. The apparatus of claim 1, wherein the continuous strip of material is divided into a plurality of discrete lengths by adjoining sections in which the first and second electrodes are absent.

11. The apparatus of claim 10, wherein the proton battery comprises an adhesive at the edges of the continuous strip configured to sealingly attach the continuous strip of material to itself whilst it is inside the casing to further inhibit exposure of the electrode junction to water from the surrounding environment, and wherein the adjoining sections comprise an adhesive configured to sealingly attach the continuous strip of material to itself whilst it is inside the casing to further inhibit exposure of the electrode junctions of the respective discrete lengths to water from the surrounding environment.

12. The apparatus of claim 9, wherein the adhesive is impermeable to water from the surrounding environment.

13. The apparatus of claim 10, wherein the continuous strip of material comprises demarcations configured to indicate one or more of the start and end of each discrete length to guide extraction of a length of the continuous strip of material from the casing.

14. A method of making an apparatus, the method comprising: forming a proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes; and forming a casing for the proton battery, the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit, wherein the proton battery is formed as a continuous strip of material, and wherein the casing comprises an opening configured to enable a length of the continuous strip to be extracted from the casing and exposed to water from the surrounding environment to produce the potential difference.

15. A method of using an apparatus, the apparatus comprising a proton battery and a casing for the proton battery, the proton battery comprising first and second electrodes configured to form an electrode junction with one another at an interface thereof, the electrode junction configured to generate protons in the presence of water to produce a potential difference between the first and second electrodes, the proton battery further comprising respective charge collectors in contact with the first and second electrodes; the casing configured to inhibit exposure of the electrode junction to water from the surrounding environment when the proton battery is contained within the casing, the casing comprising a pair of electrical terminals electrically connected to the respective charge collectors of the proton battery such that the potential difference between the first and second electrodes can be used to power an external circuit, wherein the proton battery is formed as a continuous strip of material, and wherein the casing comprises an opening configured to enable a length of the continuous strip to be extracted from the casing and exposed to water from the surrounding environment to produce the potential difference, the method comprising extracting a length of the continuous strip from the casing via the opening to expose the electrode junction to water from the surrounding environment and produce a potential difference between the first and second electrodes.

* * * * *